United States Patent [19]
Vangalis et al.

[11] 3,897,979
[45] Aug. 5, 1975

[54] TRAILER BRAKE CONTROL SYSTEM

[75] Inventors: Dan P. Vangalis, San Juan Capistrano; George K. Burdick, Mission Viejo, both of Calif.

[73] Assignee: Vantronics, Inc., Costa Mesa, Calif.

[22] Filed: July 15, 1974

[21] Appl. No.: 488,273

[52] U.S. Cl............. 303/24 BB; 188/3 R; 188/112; 188/181 A; 303/7; 303/20
[51] Int. Cl............................................. B60t 8/24
[58] Field of Search..................... 73/488, 510, 514; 180/82 R, 100, 103–104; 188/3 R, 112, 181 A; 200/52 A, 61.45 R, 61.31, 61.52; 303/7, 20, 21 A, 24 A, 24 B, 24 BB; 338/2, 46; 340/262

[56] References Cited
UNITED STATES PATENTS

| | | | |
|---|---|---|---|
| 3,053,348 | 9/1962 | Stair................... | 188/112 |
| 3,486,799 | 12/1969 | Greentree............... | 188/3 R X |
| 3,632,176 | 1/1972 | Gaeke.................. | 303/21 A |
| 3,779,612 | 12/1973 | Tschannen............... | 303/24 A X |

FOREIGN PATENTS OR APPLICATIONS

| | | | |
|---|---|---|---|
| 2,024,406 | 12/1970 | Germany............. | 188/112 |

*Primary Examiner*—Trygve M. Blix
*Assistant Examiner*—Stephen G. Kunin
*Attorney, Agent, or Firm*—Allan R. Fowler

[57] ABSTRACT

A trailer brake control system which includes a housing having a sealed compartment filled with a damping liquid and a strain gauge decelerometer and inclinometer transducer mounted in the sealed compartment, the transducer including an elongated cantilevered flat spring having a weight on its free end, the spring having a narrowed width portion adjacent its fixed end, with matched strain gauges bonded on opposite sides of the narrowed width portion. The strain gauges are included as component arms of a bridge circuit which drives a high gain integrated circuit amplifier that in turn controls a transistorized circuit for controlling electric power supplied from the brake light circuits of the towing vehicle to the trailer as the spring bends through a small angle. The housing has mounting apparatus which provides for the orientation of the elongated flat spring in the plane normal to the longitudinal axis of the trailer, with the spring extending laterally of the trailer.

14 Claims, 9 Drawing Figures

PATENTED AUG 5 1975    3,897,979

SHEET 2

TRAILER BRAKE CONTROL SYSTEM

This invention relates to trailer brake control systems, and has particular reference to an inertial and gravitational sensitive trailer brake control system adapted to be electrically coupled between a vehicle and a trailer towed by the vehicle for controlling electric power supplied from the vehicle to electrically actuated brakes on the trailer.

An inertial and gravitational sensitive trailer brake control potentially has significant advantages over some other types of trailer brake control systems, none the least of which is that it doesn't depend on measuring the degree of movement of a lever or pedal actuated by the vehicle driver or on a measure of hydraulic pressure, and its operation is more or less automatic in that there is no dependence on the vehicle driver to consciously apply the trailer brakes, thus no special requirement for reactions by the driver over his normal reactions in braking the towing vehicle itself.

Such a control system should be easily installed and conveniently connected directly to the brake lights at the rear end of the towing vehicle without requiring special modifications or additions to the vehicle, and should provide a sensitive and smooth trailer braking action in direct proportion to forward deceleration of the vehicle and to forward inclination of the roadway as when going down hill.

Moreover, the ideal control should minimize or eliminate altogether frictional engagement of moving parts due to the inevitable wear and the effect on response of having to overcome static friction; it should be instantly responsive on a continuously variable and linear basis; it should be relatively insensitive to environmental extremes and physical abuse; and, of considerable significance, it should be substantially insensitive to extraneous vibrations and acceleration components resulting from the bumping and jarring of the trailer and towing vehicle as they proceed along the roadway. Of course, as a practical matter, it is necessary to achieve all this without resorting to elaborate and expensive means, and in a practical and unobtrusive physical size.

We have invented an inertial and gravitational sensitive trailer brake control system which we believe achieves a combination of these advantages and others through the employment of a decelerometer and inclinometer transducer in conjunction with solid state electronics and means for substantially isolating the response of the transducer from acceleration components other than those directed longitudinally of the trailer or vehicle on which the transducer is mounted.

In accordance with an embodiment of our invention, the transducer comprises an elongated thin flat spring, the spring having a cantilevered fixed end and a weight attached to its free end, and means for detecting flexure of the spring. We isolate unwanted acceleration components by determining the at rest orientation of the spring relative to the direction of travel, by designing the spring and detecting means so that full response of the transducer occurs over a small angle of bending of the spring, by damping the spring, and by other measures disclosed. This achieves a continuously variable smooth response substantially isolated from extraneous acceleration components, and one which is approximately linearly proportional to the forward deceleration component supplied by the vehicle, and to the longitudinal gravitational component which results from down hill orientation of the vehicle or trailer on which the control system is mounted.

In accordance with an embodiment of our invention, the trailer brake control comprises a housing having a closed compartment filled with a damping liquid, with the spring being contained in the closed compartment. The spring has a known orientation relative to the exterior of the housing, and the housing includes means for mounting it on the trailer or vehicle with a predetermined side of the spring facing forward and with the spring extending laterally in a plane normal to the longitudinal axis of the vehicle or trailer on which the housing is mounted. The spring has a narrowed width portion near its fixed end for concentrating bending in that area, and a pair of strain gauges are bonded to opposite sides of the narrowed width portion of the spring. Thus, bending of the spring is detected by detecting the strain thereby produced, and the resulting effect on the electrical resistance of the strain gauges is a measure thereof.

The brake control system employs a solid state electrical system, including an electrical bridge circuit which electrically includes the strain gauges as component arms, a transistorized power control circuit for controlling electric power from the vehicle brake light circuits to the trailer brake, and a high gain direct coupled integrated circuit differential voltage amplifier coupling the bridge circuit to the power control circuit.

These and other important features of our invention and the function thereof will be better understood by reference to the following description of a preferred embodiment of the trailer brake control, made with reference to the accompanying drawings, in which:

Figure 1:
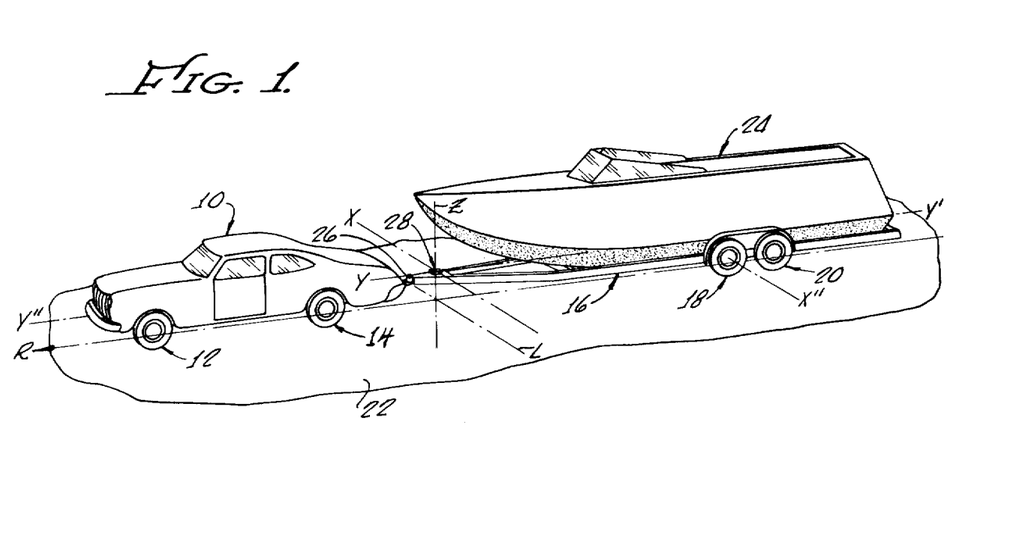
FIG. 1 is a fragmentary perspective view of a vehicle towing a loaded boat trailer along a roadway, with the trailer brake control mounted near the forward end of the trailer.

Referring to FIG. 1, a vehicle 10 having two pairs of wheels 12, 14 tows a boat trailer 16 having two pairs of wheels 18, 20 along a roadway 22, the trailer being loaded with a boat 24. The vehicle 10 is mechanically coupled to the trailer with a conventional trailer hitch 26 shown schematically.

The trailer has a longitudinal axis Y'' extending along its direction of travel, and has laterally extending wheel axes, for example the axis X'' for the leading pair of trailer wheels 18. The plane of the roadway 22 is defined by a longitudinal line or axis R extending along the direction of travel approximately parallel to the longitudinal trailer axis Y'' and having an arrow pointing in the direction of travel, and an orthogonal lateral axis L approximately parallel to the wheel axis X'' of the trailer.

Figure 2:
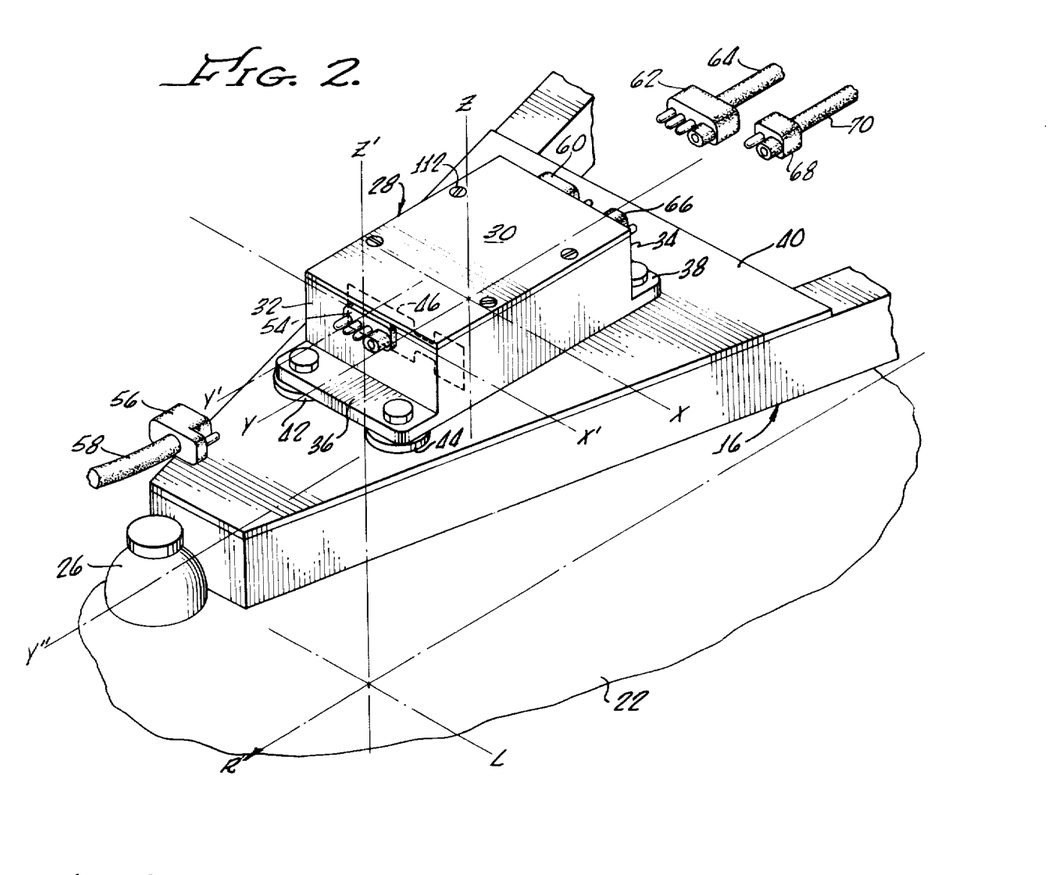
FIG. 2 is a fragmentary exploded perspective view illustrating the front end of the boat trailer with the brake control system mounted thereon, and further illustrating the input and output electrical connectors through which electrical power is supplied from the vehicle to the brake control system and from the brake control system to the trailer.

As best seen in FIG. 2, the trailer brake control system is contained by a housing 28 having orthogonal longitudinal, lateral and vertical axes Y, X, Z respectively, and the housing is mounted in a predetermined orientation near the front end of the trailer 16 so that its longitudinal axis Y and lateral axis X lie approximately parallel respectively to the longitudinal axis Y'' and wheel axis X'' of the trailer 16, and its vertical axis Z is normal to the plane of the roadway.

The housing is substantially in the form of rectangular parallelepiped having a removable top lid 30, front and rear ends 32, 34 and front and rear mounting flanges 36, 38, the respective flanges being provided with bolt holes 36a, 36b and 38a, 38b, (FIG. 3) for bolting the housing solidly to a trailer frame member 40 which lies parallel to the roadway, with the forward end 32 of the housing facing forward on the trailer. If necessary, shims or washers 42, 44 may be used under one of the flanges 36 in order to insure that the longitudinal and lateral axes Y, X of the housing lie in a plane parallel to the plane of the roadway, it being recognized that the trailer might be hitched so that its longitudinal axis Y'' does not reside quite parallel to the roadway. In short, the housing 28 should be level with the roadway, even if the trailer frame member 40 on which it is mounted is not. It should be noted that the brake control housing could be mounted in a similar orientation on the vehicle itself.

Figures 3, 4, 5:
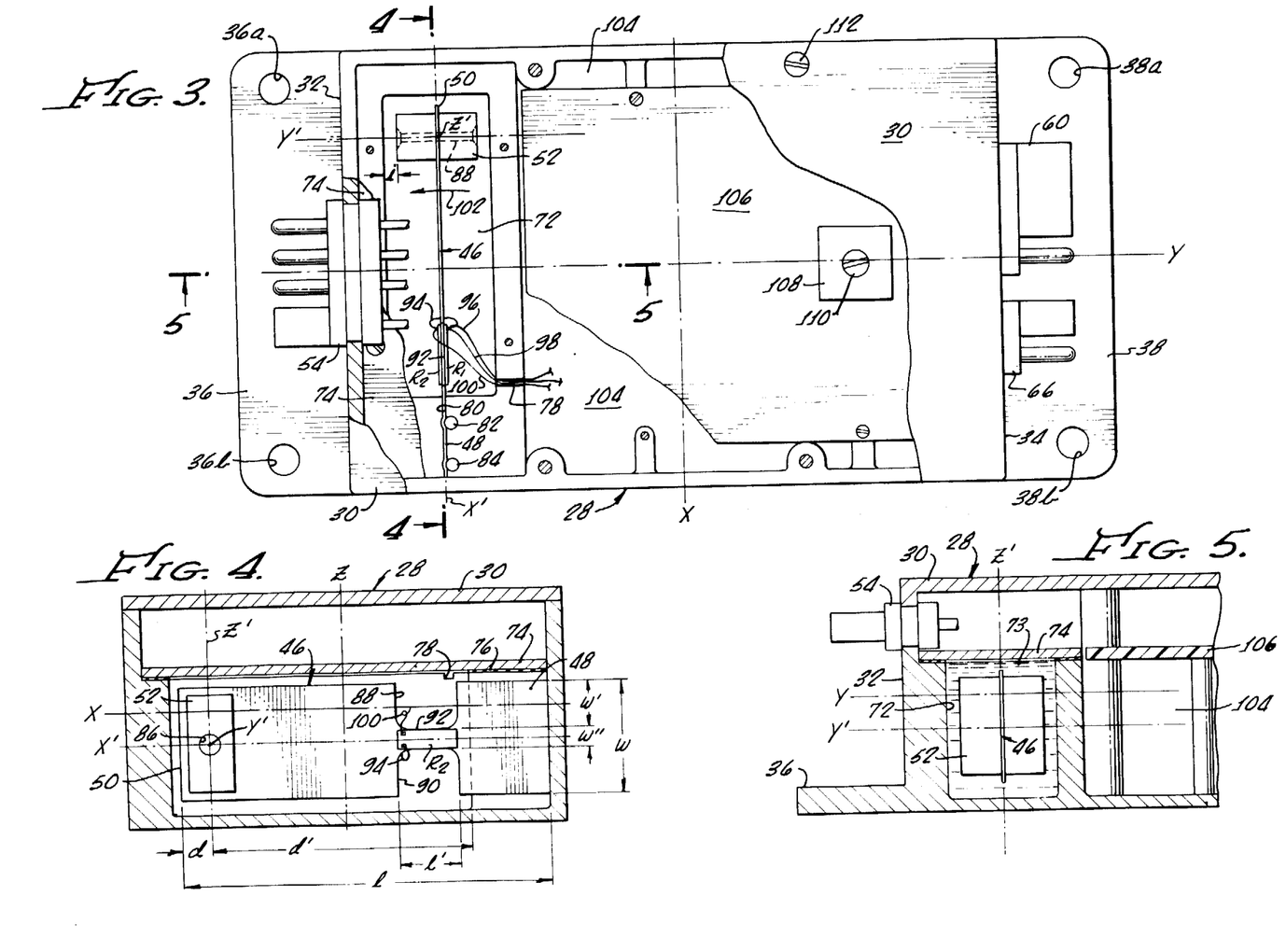
FIG. 3 is a top plan view, partially cut away, of the brake control system.
FIG. 4 is a sectional elevation taken along line 4—4 of FIG. 3.
FIG. 5 is a fragmentary sectional elevation taken along line 5—5 of FIG. 3.

The brake control system utilizes a strain gauge decelerometer and inclinometer transducer which includes an elongated flat spring 46 that extends parallel to the lateral axis X of the housing, the spring having a fixed or cantilevered end 48 and a free end 50 (FIG. 3). A weight 52 is attached to the spring adjacent its free end. As represented by orthogonal axis X', Y', Z' having their origin in the center of the weight 52 (FIG. 3) extending parallel to the axes X, Y, Z of the housing, the spring in its at rest position resides in a plane X', Z' normal to the longitudinal axis Y of the housing and Y'' of the trailer, with its center line extending laterally of the housing along the axis X'. Thus, in its at rest position, the spring extends parallel to the width of the roadway and in a plane perpendicular to the plane of the roadway.

Electrical power is supplied to the brake control system by means of an input connector having a fixed half 54 mounted through the front wall of the housing. A mating free half 56 of the input connector is connected by a cable 58 to the running light and brake light circuits of the vehicle. Electric power is supplied from the brake control system to the trailer by means of a first output connector having a fixed half 60 mounted through the rear wall 34 of the housing, and a free half 62 which mates therewith and supplies power over a cable 64 to the brake lights and running lights of the trailer. Power is supplied from the trailer brake control system to the trailer brakes by means of a second output connector having a fixed half 66 mounted through the rear wall 34 of the housing and free half 68 which mates therewith and supplies the power over a cable 70 to the trailer brakes.

The physical construction of the brake control is more clearly seen in FIGS. 3 to 5. The housing 28 includes internally adjacent its front end 32 a compartment 72 which, as best illustrated in FIG. 5, is filled with a damping liquid 73, such as 10W-40 multigrade motor oil. The compartment is sealed by a lid 74 screwed down on top of a gasket 76. A small notch 78 is formed in the compartment wall adjacent the lid 74 to accommodate wiring.

The flat elongated spring is inserted into a slot 80 in the housing, then secured by a pair of pins 82, 84 in the slot, so as to form the fixed or cantilevered end 48 thereof. The spring extends longitudinally along the X' axis freely within the compartment 72, to terminate in its free end 50. A hole 86 is formed along the spring's center line adjacent the free end thereof, and the weight 52 is connected to the free end of the spring by a rivet 88. The weight 52 weighs 2 ounces.

The spring is an elongated flat piece of 203 full hard stainless steel having a thickness of 0.015 inches. The spring has an overall length 1 of 3.75 inches along the X' axis, and an overall width w of 1.0 inches along the Z' axis. The center of the weight 52 is located a distance d of 0.375 inches from the extremity of the free end 50 of the spring. Adjacent its fixed end 48, the free span of the spring has a pair of opposing notches or cut-out portions 88, 90 each extending across the width of the spring by a distance w' of 0.375 inches and each extending along the length of the spring a distance 1' of 0.564 inches. Thus, adjacent its fixed end 58, the spring has a narrowed width portion 92 having a width of w'' of .250 inches and a length 1' of 0.564 inches. The distance d' between the center of the weight 52 and the proximal edge of the fixed end of the spring is 2.198 inches.

Two matched strain gauges, respectively a first strain gauge $R_1$ and a second strain gauge $R_1$, are bonded with appropriate adhesive to opposite sides of the narrowed width portion 92 of the spring, and of course from the part of the transducer that detects flexure of the spring. The strain gauges are type EA 06-250BF-350, available from Micro Measurements of Romulus, Michigan.

Figure 7:
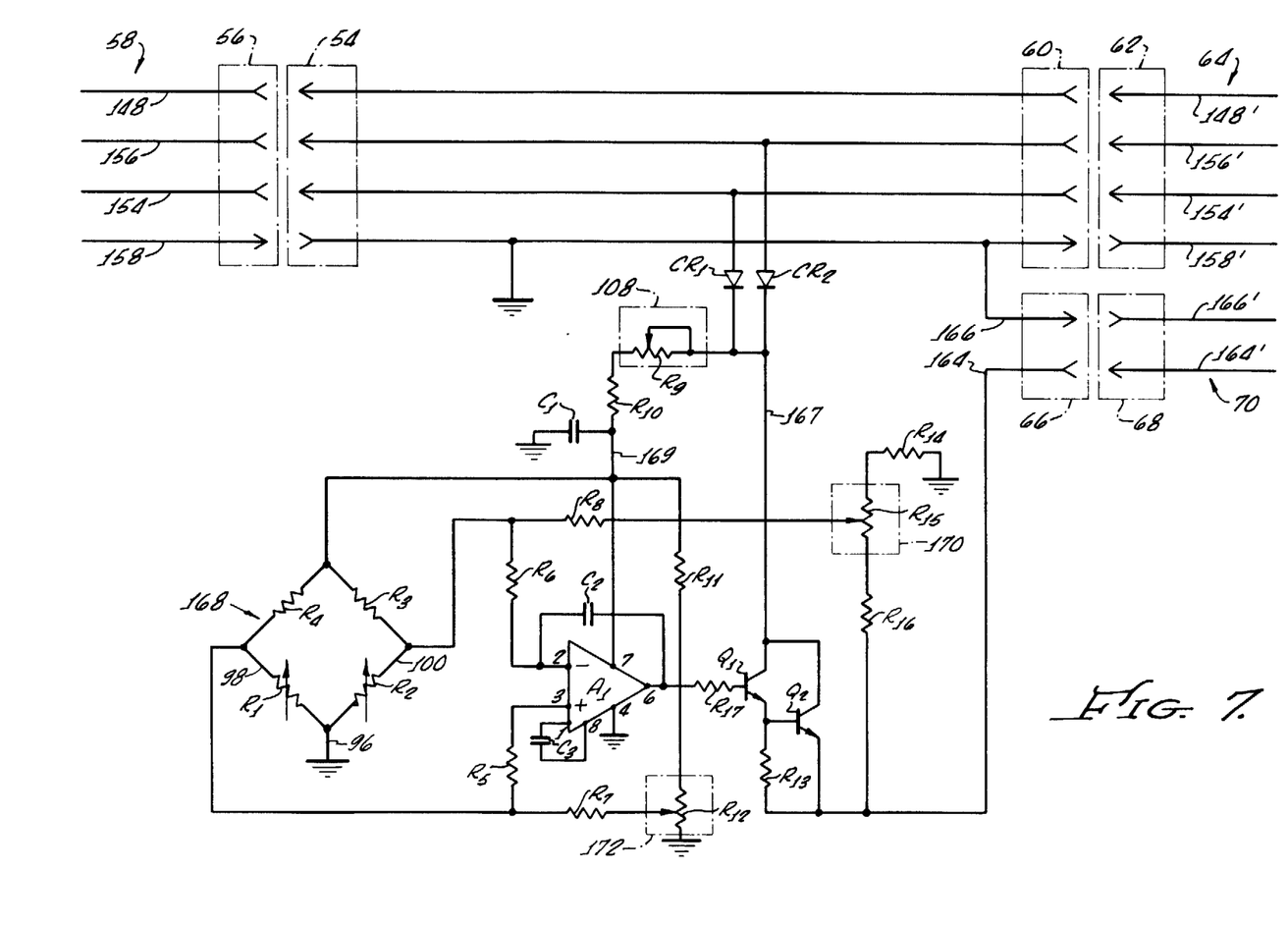
FIG. 7 is a schematic electrical circuit diagram of the brake control system.

The ground terminals of each strain gauge are coupled together by an electrical lead 94 which, in turn, is coupled by an electrical lead 96 extending through the slot 78 in the side wall of the compartment to the ground terminal of the bridge circuit shown in FIG. 7. In addition, electrical leads 98, 100 run from the second terminals of strain gauges $R_1$, $R_2$ respectively through the slot 78 to the bridge circuit. After the leads are run through the slot 78, the slot is sealed with a sealing compound so that the compartment 72 with its lid 74 is a sealed compartment filled with damping liquid.

As best seen in FIG. 3, the clearance i of 0.125 inches between the weight and the side walls of the compartment 72 places a maximum limit on deflection of the free end of the spring of 0.125 inches in either direction approximately along the Y' axis. Thus, responsive to forward deceleration or inclination of the housing, the spring bends in the direction of the arrow 102 through a maximum angle of less than 4°. To best isolate the spring from the housing, the spring is left free to bend a similarly restricted amount in the opposite direction of the arrow 102, although as will be seen, this bending produces no responsive output of the brake control system to the trailer brakes.

A relatively large compartment 104 is formed between the closed compartment 72 and the rear end 34 of the housing. An electrical circuit board 106 is mounted in this compartment, and mounts most of the electrical circuitry of the brake control system. Mounted on the top side of the circuit board 160 is a potentiometer 108 having a mechanical adjustment screw 110 readily accessible by removing the top lid 30 of the housing through the removal of its hold down screws, such as the screw shown typically at 112.

Figure 6:
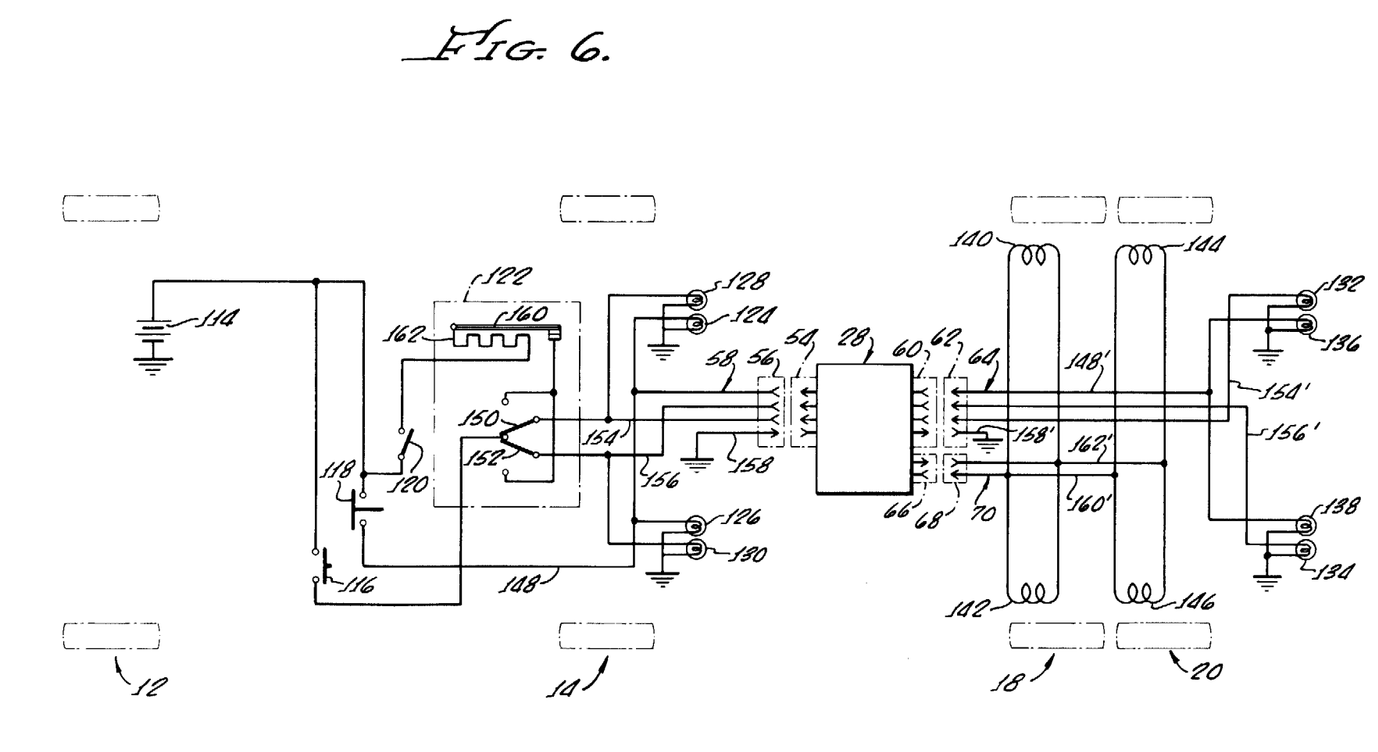
FIG. 6 is a schematic diagram illustrating the brake control system coupled between the electrical circuits of the vehicle and the trailer.

Referring now to FIG. 6, the electrical coupling of the brake control system between the electrical circuits of the towing vehicle and trailer is shown schematically. The towing vehicle has a storage battery 114, a brake light switch 116, a main light switch 118, an ignition switch 120, a turn signal control circuit 122, right and left running lights 124, 126 and right and left brake lights 128, 130. The trailer has right and left brake lights 132, 134, running lights 136, 138 and electrical brake coils 140, 142, 144 and 146.

By inspection it will be seen that when the main light switch 118 is closed, current will be supplied from the vehicle battery 114 over the lead 148 to the vehicle running lights 124, 126 and through the input and output connectors of the brake control housing 28 over a lead 148' to the running lights 136, 138 of the trailer. Also, it can be seen that when the brake light switch 116 in the vehicle is closed, as happens when the driver first depresses the brake pedal, without necessarily applying any braking force to the vehicle, electrical energy is supplied from the vehicle battery 114 through a pair of switches 150, 152 of the turn signal control 122 and thence over a pair of leads 154, 156 to the right and left brake lights 128, 130 of the vehicle respectively, and through the input and output connectors of the brake control housing 28 and over leads 154', 156' running to the right and left brake lights 132, 134 respectively of the trailer. A ground connection runs from the vehicle to the trailer through the input and output connectors of the brake control housing over electrical leads 158, 158'.

The turn signal control 122 contains a normally closed bimetallic switch 160 responsive to a heater 162. When the heater is heated, the normally closed bimetallic switch 160 opens interrupting current through the heater, and then closes when the heater cools, whereupon the cycle repeats itself. When the ignition switch 120 is closed, and either of the right or left turn signal switches 150, 152 is manually actuated from its normal position, a circuit is closed over a selected one of the leads 154, 156 respectively running to the right and left brake lights, wherefrom the brake light so selected must receive its power through the bimetallic switch 160 which periodically opens and closes, thereby producing a flashing light as a turn signal indication.

The electrical circuitry of the brake control system is shown schematically in FIG. 7. As seen in FIGS. 6 and 7, this circuitry is interposed serially in the power line to the electric trailer brakes, represented by the brake light leads 154, 156 from the vehicle through the input connectors 56, 54, through the brake control circuitry, and through the output connectors 66, 68 over output leads 164, 164' and ground lead 166, 166' to the trailer brake coils.

The right and left brake light leads 154, 156 of the vehicle are coupled through the input connectors 56, 54 directly to the brake control circuit by a pair of rectifiers $CR_1$ and $CR_2$ respectively. This assures a steady electrical power supply to the brake control circuit when the brake light switch 116 is actuated in the vehicle, without interferring with the turn signals. Being unidirectional conductive devices, the rectifiers maintain the right and left brake light circuits isolated from one another. This permits a simple connection to the brake light leads 154, 156 which are readily accessible at the rear of the towing vehicle, without requiring special wiring to other portions of the vehicle or special vehicle accessories.

When the brake light switch in the vehicle is closed, power is supplied through the solid state power control circuit comprised of first and second transistors $Q_1$, $Q_2$ and resistor $R_{13}$, the transistors being connected in common collector configuration and in turn supplying power over the output lead 164 to the trailer brake coils. The power control circuit is responsive to the output voltage of a bridge circuit 168 containing resistors $R_3$, $R_4$ and strain gauges $R_1$, $R_2$ as component arms. The bridge circuit output is applied across input resistors $R_5$, $R_6$ to the inverting (−) and noninverting (+) input terminals 2, 3 respectively of a high gain direct coupled solid state differential amplifier $A_1$, the output terminal 6 of which is coupled through a resistor $R_{17}$ to the base of the first transistor $Q_1$ in the power control circuit.

Voltage to the bridge circuit 168 and to the supply pin 7 of the amplifier $A_1$ is supplied over a lead 169 which is coupled to the rectifiers $CR_1$ and $CR_2$ by a resistance-capacitance network consisting of a grounded capacitor $C_1$, a series resistor $R_{10}$ and the tapped portion of the resistor $R_9$ of the manually adjustable potentiometer 108. By adjusting the potentiometer 108, the supply voltage to the bridge and amplifier can be set to a value which, for a given trailer set up and given road conditions, limits the maximum voltage output of the amplifier $A_1$ to a value whereby the power supplied through the responsive power control circuit to the trailer brakes is slightly below that required to lock the trailer wheels. The grounded capacitor $C_1$ is provided to short any high frequency noise to ground.

An adjustable potentiometer 170 has a resistor $R_{15}$ which is coupled at one end to the power output lead 164 through a resistor $R_{16}$, and is coupled at its other end to ground through a resistor $R_{14}$. The adjustable tap of the potentiometer 170 is coupled through a resistor $R_8$ back to the input resistor $R_6$ to the inverting input terminal of the amplifier $A_1$, so as to form an adjustable negative feedback loop for adjusting the gain of the amplifier $A_1$ to slightly below the point where the brake control might be self-energizing.

The supply voltage over the lead 169 is also divided across a resistor $R_{11}$ in series with the grounded resistor $R_{12}$ of an adjustable potentiometer 172. The adjustable tap on the potentiometer 172 is connected through a series resistor $R_7$ to the input resistor $R_5$ of the noninverting input terminal of the amplifier. By adjusting the potentiometer 172, the output of amplifier $A_1$ can be set to zero for zero strain on the strain gauges $R_1$ and $R_2$ as a matter of calibrating the circuit.

A capacitor $C_2$ is connected in a negative feedback loop between the output pen 6 and inverting input terminal pin 2 of the amplifier $A_1$ and, in conjunction with the input resistor $R_6$, comprises an integrating circuit which operates as a low pass filter for filtering out signals having a frequency in excess of about 10 Hertz, as an assist to the mechanical damping of the spring.

The purpose of the small capacitor $C_3$ is for high frequency compensation, as recommended for the particular amplifier used, which is an integrated circuit amplifier having terminal pins numbered as shown in the drawing.

Typical values and denominations for the various circuit elements are given in the following table:

| | | | |
|---|---|---|---|
| $CR_1$ | IN 1911 | $R_9$ | 200 Ohms |
| $CR_2$ | IN 1911 | $R_{10}$ | 22 Ohms |
| $R_1$ | EA 06-250BF-350 | $R_{11}$ | $2.43 \times 10^3$ Ohms |
| $R_2$ | EA 06-250BF-350 | $R_{12}$ | 200 Ohms |
| $A_1$ | LM308A | $R_{13}$ | 470 Ohms |
| $Q_1$ | 2N3506 | $R_{14}$ | 36 Ohms |
| $Q_2$ | 2N3771 | $R_{15}$ | 200 Ohms |
| $R_3$ | 350 Ohms | $R_{16}$ | $2.43 \times 10^3$ Ohms |
| $R_4$ | 350 Ohms | $R_{17}$ | 20 Ohms |
| $R_5$ | $10 \times 10^3$ Ohms | $C_1$ | $.47 \times 10^{-6}$ Farads |
| $R_6$ | $10 \times 10^3$ Ohms | $C_2$ | $.001 \times 10^{-6}$ Farads |
| $R_7$ | $150 \times 10^3$ Ohms | $C_3$ | $30 \times 10^{-12}$ Farads |
| $R_8$ | $150 \times 10^3$ Ohms | | |

The use of a spring having a free end with a weight thereon as the main component of the decelerometer and inclinometer transducer affords many advantages, including the fact that there is no static friction to overcome since there is no engagement of moving parts. However, as will be seen, it is important that the transducer's full range of response requries the bending of the spring only through a small angle of about 10° or less, and preferably only about 4° or less, in order to insure linearity of response and to substantially isolate the response from extraneous acceleration components occurring in directions other than longitudinally of the trailer.

Further, it is desirable to detect the bending of the spring with minimum reliance on critical mechanical position tolerances, as would be occasioned for example by a variable capacitive, inductive or photosensitive detection of the small deflection of the free end of the spring. Hence, in accordance with one aspect of our invention, rather than detect end movement, we detect bending of the spring by measuring the strain thereby produced in the spring, which can be done by bonding a strain gauge thereto and utilizing the change of electrical resistance of the strain gauge.

Since the spring is to bend only through a small angle, we provide the narrowed width portion 92 on the spring adjacent the fixed end of the spring so as to concentrate the bending in that portion rather than permitting the bending to be more or less evently distributed over the length of the spring. By attaching a strain gauge to the face of this narrowed width portion 92, an adequate response is obtainable even though the spring bends through only a small angle.

Moreover, by using two matched strain gauges $R_1$, $R_2$ bonded to opposite sides of the narrowed width portion 92 and employing the two gauges as component arms of the bridge circuit 168, the effective response is doubled in magnitude, and other advantages are obtained such as temperature compensation and at least partial compensation for any strain induced by acceleration components directed along the length of the spring itself.

The spring 46 bends responsive to the inertia of the weight 52 when the fixed end of the spring is accelerated or decelerated, and also bends responsive to the acceleration of gravity acting on the weight. More specifically, the spring bends responsive to the combination of the inertial and gravitational components directed normal to the spring, or aporoximately longitudinal of the housing 28 and trailer. When the spring 46 bends in the forward direction as represented by the arrow 102, one strain gauge $R_1$ will be placed under tension causing its resistance to increase a very small amount and the other strain gauge $R_2$ will be placed under compression causing its resistance to decrease in a like amount. With the vehicle brake switch closed so that power is supplied to the bridge circuit 168, the output of the bridge circuit will be in millivolts, which means that the amplifier $A_1$ must operate at a voltage gain of about 1,000 in order to provide an output in volts to control the first transistor $Q_1$, hence to control amperes of current supplied through the power control circuit to the trailer brake coils.

Should the spring 46 deflect in the rearward or reverse direction, the polarity of the bridge output to the amplifier A would be reversed, causing the output of the amplifier A to go to ground, keeping both transistors $Q_1$ and $Q_2$ baised off, hence supplying no current to the brake coils.

In accordance with the structure depicted, the strain gauges $R_1$ and $R_2$ are operated well within their design capabilities so that they have an indefinitely long operating life expectancy. The confines of the walls of the housing compartment 72, which by engagement with the weight 52 limit the total deflection of the free end of the spring to about one-eighth inch in either direction, acts as a safety measure to protect the strain gauges from strains beyond their design as could be occasioned by sever accelerations applied to the housing 29 under abnormal conditions.

It should be recognized that when mounted on a trailer being towed over a roadway there is much vibration, bouncing and jarring applied to the brake control housing 28 hence to the fixed end of the spring from many different directions; yet, the requirement is for a decelerometer and inclinometer which is sensitive and smoothly responsive to forward deceleration and inclination of the housing along the longitudinal direction, so that the trailer brakes are instantly and proportionately responsive thereto, all while substantially ignoring the extraneous acceleration components applied to the housing. As might be expected when pulling a trailer over a roadway, the most prevalent extraneous component will normally be the up and down bouncing in the direction normal to the roadway.

Some of the extraneous acceleration components, particularly the vibratory components in the longitudinal direction, are substantially isolated by the viscous damping applied to the spring as the result of its being in a closed compartment filled with damping liquid, and by the integrating circuit $C_2$, $R_6$ in the brake control electrical system. Other extraneous acceleration components are substantially isolated by the choice of an elongated flat spring, its orientation relative to the trailer, and its design for full scale operation of strain gauges while bending through only a small angle.

Figure 8:
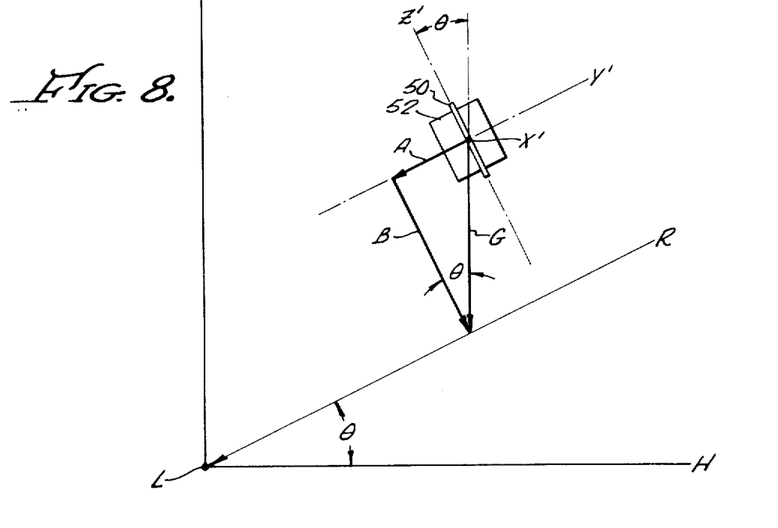
FIG. 8 is a force vector diagram schematically illustrating the weighted spring of the brake control system extending laterally of the trailer when the trailer is pointed down hill, all referred to orthogonal coordinates.

Referring now to FIG. 8, the free end 50 of the spring and the weight 52 thereon is shown schematically, with the spring extending laterally of the housing, as is otherwise depicted in FIGS. 2 through 5. The orthogonal axes V, H and L represent true vertical, horizontal and lateral directions. The plane of the roadway is defined by the line R and lateral axis L, and is inclined in the forward direction by an angle $\theta$ from the horizontal, the forward direction being indicated by the arrow on the line R. This is the condition which obtains when the trailer is going down hill.

In the vector diagram of FIG. 8, the acceleration of gravity G acting on the weight 52 can be divided into two vector components, a longitudinal component A in the forward direction normal to the plane of the spring and parallel to the roadway which is effective in producing bending of the spring in the forward direction, and a component B which is normal to the roadway and is substantially ineffective in producing bending of the spring because it is parallel to the Z' axis which extends across the width of the spring. Thus, the effective vector component A is along the Y' axis which is parallel to the longitudinal axis Y of the housing 28 and to the longitudinal axis Y'' of the trailer. This vector component A is equal to G Sin $\theta$. Thus, it increases as the forward inclination of the roadway increases, and is zero when $\theta$ is zero.

It is to be noted that with the spring extending along the X' axis, hence laterally of the trailer, the bending response of the spring is not affected substantially by acceleration components normal to the roadway regardless of the angle. More specifically, the bending response is isolated from the rather severe acceleration components resulting from the bounce of the trailer normal to the roadway due to bumps, etc., and this is true regardless of the degree of forward bending of the spring due to other longitudinal acceleration components since the width of the spring along or parallel to the axis Z' always remains normal to the roadway.

Figure 9:
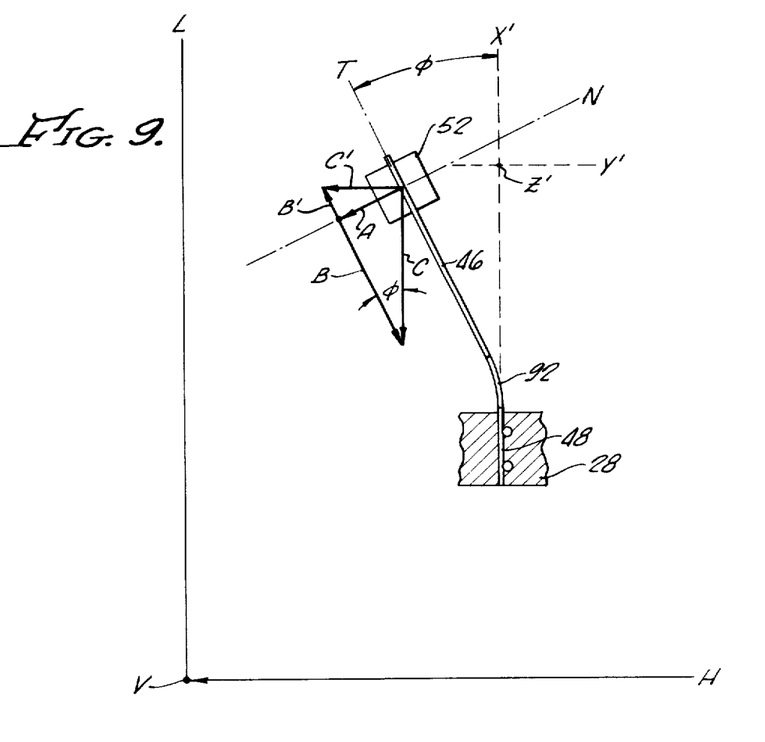
FIG. 9 is a force vector diagram schematically illustrating the weighted spring extending laterally with respect to the trailer when the trailer is on a level roadway, the spring being shown in a deflected condition, all referred to orthogonal coordinates.

Referring now to FIG. 9, the spring 46 is shown from a top view in a similar orthogonal coordinant system V, H, L, and it is assumed that the roadway lies in the horizontal plane H, L with the spring extending laterally with respect to the trailer and normal to the longitudinal axis of the trailer. The arrow on the H axis indicates the forward direction. The spring's at rest position is indicated by the dotted axes X', Y', Z', and the spring is shown deflected through an angle $\phi$, the angle $\phi$ being measured between the at rest position X' and the tangent T to the arc of the bent spring at the center of the weight 50.

Assuming that a forward deceleration is applied to the housing 28, hence to the fixed end 48 of the spring, the weight 52 will produce a forward inertial force C', which resolves into an effective component A normal to the spring, as indicated by the normal axis N passing through the center of the weight, and a component B' which is substantially ineffective because it is directed approximately along the length of the spring. Thus, the effective component A is equal to C' Cos $\phi$. This accounts for the linearity of the transducer response, since if the maximum bending of the spring is kept to under 10°, the maximum linearity error will be less than than 1.5 per cent of the inertial force C' resulting from applied deceleration. By inspection it can be seen that the same is true of longitudinal gravitational components as respects linearity.

Assuming that a lateral acceleration is applied to the housing 28, hence to the fixed end 48 of the spring, the weight 52 will produce a lateral inertial force C, which resolves into an effective component A normal to the spring, and a component B which is substantially ineffective because it is directed along the length of the spring. The effective component A in this instance is equal to C Sin $\phi$. Thus, when a lateral acceleration is applied to the housing with the spring 46 already bent through 10°, about 17.4 per cent of the resulting extraneous force C will act as an effective component producing further bending of the spring, thereby creating a significant extraneous response transmittable to the trailer brakes. On the other hand, if the angle of bending of the spring $\phi$ is limited to a maximum of 4° or less, then the maximum effect of a lateral component on the spring would be 6.9 per cent of that lateral component. Moreover, it is recognized that lateral components are rather small in any event, as compared for example with extraneous accelerations normal to the roadway as results from bouncing of the trailer and vehicle on the roadway.

If in FIG. 9 the at rest position of the spring extended vertically instead of laterally of the trailer, thereby extended normally of the roadway, which would be a nonpreferred orientation of the spring, then the heavy and expected extraneous accelerations normal to the roadway would be effective as a function of Sin $\phi$. Moreover, there would also be an extraneous gravitational component, the effectiveness of which would be a function of Sin $\phi$. And, both would obtain whether the spring was pointed upwardly or downwardly on the trailer.

Hence, it is clear that there is a decided advantage in orienting the spring so that it extends laterally of the trailer and normal to the longitudinal axis of the trailer, in order to isolate extraneous components normal to the roadway as well as extraneous gravitational components, all as would act on the weighted end of the spring once the spring was already bent through an angle $\phi$. Further, keeping the angle $\phi$ very small for the total response range of the transducer as a matter of design, not only maximized the linearity of the response to longitudinal components, but also minimizes the effect of extraneous components directed along the rest position of the spring as defined by the X' axis, whether that axis be vertical or horizontal.

While the described brake control would be operative even with the spring disposed in a vertical position due to its total deflection being limited to 4° or less, a very small angle, the lateral orientation has distinct advantages and becomes more necessary as the angle of bending of the spring is permitted to increase.

We claim:
1. An inertial and gravitational sensitive trailer brake control system adapted to be electrically coupled between a vehicle having brake light circuits and a wheeled trailer towed by the vehicle for controlling electric power supplied from the vehicle to electrically actuated brakes on the trailer, comprising:
a housing orthogonal longitudinal, lateral and vertical axes and a forward end;
means for mounting the housing on the trailer or vehicle with its forward end facing forward thereon and with its longitudinal and lateral axes approxi- mately parallel respectively to the longitudinal and wheel axes of the trailer or vehicle on which it is mounted;

said housing including a closed compartment filled with a damping liquid;

a decelerometer and inclinometer transducer mounted in the housing;

said transducer comprising an elongated flat spring mounted in the closed compartment as a cantilever and having a fixed end and a free end, a weight mounted on the free end of the spring, and means for detecting flexure of said spring in the forward direction of said housing;

the elongated flat spring being oriented so that it extends approximately parallel to the lateral axis of the housing in a plane approximately normal to the longitudinal axis of the housing;

solid state electrical means coupled to the decelerometer and inclinometer transducer and sensitive to the response thereof and to energization of the brake light circuits of the vehicle for exercising a control over the degree of electric power supplied from the vehicle to the trailer brakes;

means for electrically coupling the solid state electrical means to the brake light circuits of the vehicle; and, means for electrically coupling the solid state electrical means to the trailer brakes.

2. The apparatus of claim 1 wherein the towing vehicle has left and right brake light circuits coupled to left and right turn signal circuits, and wherein the means for electrically coupling the solid state electrical means to the brake light circuits of the vehicle includes a pair of rectifiers, and means for electrically coupling the rectifiers respectively to the left and right brake light circuits of the vehicle.

3. An inertial and gravitational sensitive trailer brake control system adapted to be electrically coupled between a wheeled vehicle having brake light circuits and a wheeled trailer towed by the vehicle for controlling electric power supplied from the vehicle to electrically actuated brakes on the trailer, comprising:

a housing having orthogonal longitudinal, lateral and vertical axes and a forward end;

means for mounting the housing on the trailer or vehicle with its forward end facing forward thereon and with its longitudinal and lateral axes approximately parallel respectively to the longitudinal and wheel axes of the trailer or vehicle on which it is mounted;

a strain gauge decelerometer and inclinometer transducer mounted in the housing and responsive on a continuously variable basis to forward deceleration and gravitational force components directed longitudinally of the housing;

means for substantially isolating the response of the strain gauge decelerometer and inclinometer transducer from acceleration components other than those directed longitudinally of the housing;

solid state electrical means coupled to the strain gauge decelerometer and inclinometer transducer and sensitive to the response thereof and to energization of the brake light circuits of the vehicle for exercising a control over the degree of electric power supplied from the vehicle to the trailer brakes;

means for electrically coupling the solid state electrical means to the brake light circuits of the vehicle; and, means for electrically coupling the solid state electrical means to the trailer brakes.

4. The apparatus of claim 3 wherein the strain gauge decelerometer and inclinometer transducer comprises an elongated flat spring extending laterally of the housing in a plane approximately normal to the longitudinal axis of the housing, the spring having a fixed end and a free end with a weight thereon, the spring also having a narrowed portion near the fixed end thereof, and at least one strain gauge bonded to the narrowed portion of the spring.

5. The apparatus of claim 3 wherein the strain gauge decelerometer and the inclinometer transducer comprises an elongated flat spring disposed in a plane approximately normal to the longitudinal axis of the housing, the spring being in the form of a cantilever and having a fixed end and a free end with a weight thereon, the spring having a flat narrowed portion near the fixed end thereof, and a pair of matched strain gauges bonded on opposite sides of the flat narrowed portion of the spring.

6. The apparatus of claim 5 wherein the housing contains a closed compartment enclosing the strain gauge decelerometer and inclinometer transducer, said compartment being filled with a damping liquid.

7. The apparatus of claim 6 wherein the total angle through which the spring can bend is restricted by the confines of the compartment to an angle on the order of 10° or less.

8. The apparatus of claim 5 wherein the elongated flat spring extends approximately parallel to the lateral axis of the housing, hence laterally of the trailer or vehicle when the housing is mounted thereon.

9. The apparatus of claim 5 wherein the solid state electrical means comprises an electrical bridge circuit which electrically includes the strain gauges as component arms, a transistorized power control circuit for controlling electric power from the vehicle brake light circuits to the trailer brakes, and a direct coupled integrated circuit differential voltage amplifier coupling the bridge circuit to the power control circuit.

10. The apparatus of claim 9 wherein an adjustable potentiometer is mounted in an accessible position on the housing, and controls the supply voltage to the bridge circuit and amplifier.

11. The apparatus of claim 5 wherein the strain gauge decelerometer and inclinometer transducer provides its full range of response over a bending of the spring through an angle on the order of 10° or less.

12. In combination, a wheeled trailer having an electric brake system including electric brake coils and an electric power line running to the brake coils, the trailer having a longitudinal axis and a forward end; and, an inertial and gravitational sensitive brake control device serially interposed in said electric power line, said brake control device comprising a housing having a closed compartment filled with a damping liquid, an elongated flat spring mounted as a cantilever in the closed compartment and having a free end with a weight affixed thereto, the elongated flat spring being oriented in a plane approximately normal to the longitudinal axis of the trailer with the spring extending laterally of the trailer approximately parallel to the wheel axes thereof, means for detecting flexure of the spring in the forward direction of the trailer, and solid state electrical means responsive to the detecting means and to the input of electrical power on said power line for varying the degree of electrical power supplied to said brake coils.

13. The apparatus of claim 12 wherein the spring has a narrowed width portion near its fixed end, and the detecting means comprises a pair of matched strain gauges bonded on opposite sides of the narrowed width portion of the spring.

14. The apparatus of claim 13 wherein the confines of the housing compartment limits bending of the spring to an angle on the order of 4° or less.

* * * * *

UNITED STATES PATENT OFFICE
CERTIFICATE OF CORRECTION

PATENT NO. : 3,897,979
DATED : August 5, 1975
INVENTOR(S) : Dan P. Vangalis & George K. Burdick It is certified that error appears in the above-identified patent and that said Letters Patent are hereby corrected as shown below:

Col. 4, line 46, The second occurrence of "$R_1$" should be --$R_2$--

Col. 13, line 4, "electrical" should be --electric--

Signed and Sealed this twenty-fourth Day of February 1976

[SEAL]

Attest:

RUTH C. MASON
Attesting Officer

C. MARSHALL DANN
Commissioner of Patents and Trademarks